(12) United States Patent
Etesse

(10) Patent No.: US 9,272,456 B2
(45) Date of Patent: Mar. 1, 2016

(54) INJECTION STRETCH BLOW MOLDING PROCESS

(75) Inventor: Patrick Jean-Francois Etesse, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 1819 days.

(21) Appl. No.: 12/568,205

(22) Filed: Sep. 28, 2009

(65) Prior Publication Data

US 2010/0080944 A1   Apr. 1, 2010

(30) Foreign Application Priority Data

Sep. 30, 2008   (EP) ..................................... 08165461

(51) Int. Cl.

| | | |
|---|---|---|
| *B29D 22/00* | (2006.01) | |
| *B29C 49/16* | (2006.01) | |
| *B29C 49/64* | (2006.01) | |
| *B29B 11/08* | (2006.01) | |
| *B29B 11/10* | (2006.01) | |
| *B29B 11/12* | (2006.01) | |
| *B29B 11/14* | (2006.01) | |
| *B29C 49/06* | (2006.01) | |
| *B29C 35/08* | (2006.01) | |
| *B29K 23/00* | (2006.01) | |
| *B29L 31/00* | (2006.01) | |

(52) U.S. Cl.
CPC ............. *B29C 49/16* (2013.01); *B29C 49/6418* (2013.01); *B29B 11/08* (2013.01); *B29B 11/10* (2013.01); *B29B 11/12* (2013.01); *B29B 11/14* (2013.01); *B29B 2911/1402* (2013.01); *B29B 2911/1404* (2013.01); *B29B 2911/1416* (2013.01); *B29B 2911/14026* (2013.01); *B29B 2911/14033* (2013.01); *B29B 2911/1498* (2013.01); *B29B 2911/14106* (2013.01); *B29B 2911/14133* (2013.01); *B29B 2911/14213* (2013.01); *B29B 2911/14666* (2013.01); *B29C 49/06* (2013.01); *B29C 2035/0822* (2013.01); *B29K 2023/06* (2013.01); *B29K 2023/065* (2013.01); *B29K 2023/12* (2013.01); *B29K 2623/06* (2013.01); *B29L 2031/7158* (2013.01); *Y10T 428/1397* (2015.01)

(58) Field of Classification Search
None
See application file for complete search history.

(56) References Cited

U.S. PATENT DOCUMENTS

| | | | | |
|---|---|---|---|---|
| 4,039,641 A | * | 8/1977 | Collins ........................... | 264/28 |
| 5,972,255 A | * | 10/1999 | Takada et al. ................... | 264/39 |
| 2006/0231985 A1 | | 10/2006 | Kelley | |
| 2007/0187876 A1 | | 8/2007 | Cink et al. | |
| 2007/0235905 A1 | | 10/2007 | Trude et al. | |

FOREIGN PATENT DOCUMENTS

| | | | |
|---|---|---|---|
| EP | 0654 340 | A1 | 5/1995 |
| EP | 1169231 | B1 | 11/2004 |
| EP | 1484160 | A1 | 12/2004 |
| EP | 1688 234 | A2 | 8/2006 |
| EP | 1870223 | A1 | 12/2007 |
| JP | 2000/086722 | A2 | 3/2000 |
| WO | WO 2007/100504 | A2 | 9/2007 |

OTHER PUBLICATIONS

PCT International Search Report, dated: Jan. 12, 2010, 8 pages.

* cited by examiner

*Primary Examiner* — Monica Huson
(74) *Attorney, Agent, or Firm* — Gary J. Foose

(57) ABSTRACT

The present invention relates to a process for blow molding a polyethylene container comprising the steps of:
  a) providing a solid preform made from a polyethylene material having a melt flow index from 0.01 to 10.0 g/10 minutes, wherein the preform comprises a neck region, side walls and a base region, and wherein the side walls between the neck region and the base region have substantially straight and parallel outer walls;
  b) reheating the preform so that the maximum temperature difference between the hottest and coldest regions of the side walls and the base region of the reheated preform is less than 4° C.;
  c) transferring the reheated preform to a blow mold;
  d) stretching the preform at a pressure below 10 bars; and
  e) increasing the pressure within the reheated preform so as to cause the walls of the stretched preform to expand to the shape and dimensions inside the blow mold.

A polyethylene container made according to the present invention preferably has a minimum wall thickness of the container of less than 200 micrometers, and a weight to volume ratio of the empty container of less than 50 grams per liter.

8 Claims, No Drawings

INJECTION STRETCH BLOW MOLDING PROCESS

FIELD OF THE INVENTION

Injection stretch blow molding is a widely practiced process for the manufacture of bottles which are made from polyester, in particular from polyethylene terephthalate. Such bottles are commonly used, amongst other purposes, for the packaging of soft drinks.

BACKGROUND OF THE INVENTION

The physical properties of polyethylene terephthalate are such that this material lends itself well to the injection stretch blow molding process.

In contrast, the physical properties of polyethylene are considered much less well-suited for injection stretch blow molding. JP-A-2000/086722, published on Mar. 28, 2000, discloses a high density polyethylene resin which is subjected to injection stretch blow molding. The polyethylene resin has a melt flow index of from 1 to 15 g/10 minutes; a flow ratio of from 10 to 14.5; and a density of from 0.961 to 0.973 g/cm$^3$.

Plastic parts stress crack when they are under tensile stress and in contact with liquids either by an oxidative or lubrication mechanism. This process is known as Environmental Stress Cracking. The oxidative mechanism (i.e., cleavage of polymer molecules) is present in liquids that contain oxidants (e.g. hypochlorite, and hydrogen peroxide) and the lubrication mechanism is present in liquids that contain surfactants. With either mechanism, the number density and length of the tie molecules (i.e., molecules that connect the various crystallites) is the controlling parameter for the environmental stress crack resistance (ESCR). Note that stress cracking occurs only in tensile loading, not compressive. In other words, in a bottle, stress cracking can occur only in the regions that are under tensile deformation and in contact with the liquid. As the polyethylene material is under tensile load in the trade or in the lab, the crystallites are under stress and they start moving away from each other as the tie molecules are stretched. In the brittle mode of failure, the tie molecules completely pull away from the crystallites causing them to separate. In the ductile failure, the tie molecules cause the crystallites to fracture and create fibrils. The oxidants in the liquid (e.g. bleach) cleave the tie molecules causing earlier failure than when the material is exposed to water or air. Furthermore, surfactants in the liquid lubricate the disentanglement of the tie molecules and their separation from the crystallites. In terms of measurable properties, ESCR increases with the average molecular weight (as the number of tie molecules increases with molecular weight), and decreases with increasing breadth of the molecular weight distribution, crystallinity and spherulitic size.

Limitations including manufacturing cost and manufacturing speed, and environmental stress crack resistance properties have prevented injection stretch blow molded polyethylene bottles from achieving commercial success. The present invention aims to overcome the limitations of the prior art.

SUMMARY OF THE INVENTION

A process for blow molding a polyethylene container comprising the steps of:
  a) providing a solid preform made from a polyethylene material having a melt flow index from 0.01 to 10.0 g/10 minutes, wherein the preform comprises a neck region, side walls and a base region, and wherein the side walls between the neck region and the base region have substantially straight and parallel outer walls;
  b) reheating the preform so that the maximum temperature difference between the hottest and coldest regions of the side walls and base region of the reheated preform is less than 4° C.;
  c) transferring the reheated preform to a blow mould;
  d) stretching the preform at a pressure below 10 bars; and
  e) increasing the pressure within the reheated preform so as to cause the walls of the stretched preform to expand to the shape and dimensions inside the blow mould.

A polyethylene container made according to the present invention preferably has a minimum wall thickness of the container is less than 200 micrometers, and a weight to volume ratio of the empty container is less than 50 grams per liter.

DETAILED DESCRIPTION OF THE INVENTION

The preform for use in the process of the present invention comprises a neck region, side walls and a base region. The side walls of the preform, between the neck region and the base region, have substantially straight and parallel outer walls outer wall surfaces, thus forming a substantially symmetrical tube on its outer dimensions from a point near the closed end to a point near the open end. The inner wall of the preform is generally profiled due to a transition zone. It has been found that preform designs with parallel and straight outer walls allow even reheating and even stretching of polyethylene and are thus aid the blowing of the final container. Another benefit of parallel straight wall preform designs is that it maximizes the amount of material that can be packed in a given neck design and minimizes stretch ratios. This is important in the context of polyethylene due to its lower density than more traditional materials used for injection stretch blow molding, like polyethylene terephthalate, and due to its non strain hardening properties requiring lower stretch ratios.

Polyethylene may be a homopolymer consisting of ethylene monomeric units, or may be a copolymer comprising ethylene units co-polymerised with other monomeric units, preferably C3 to C20 alpha olefins.

Typically the melt temperature of polyethylene useful in the present invention is from about 180 to about 220° C.

In one embodiment, the polyethylene is "bio-sourced PE", that is, it has been derived from a renewable resource, rather than from oil. In embodiment, sugar cane is fermented to produce alcohol. The alcohol is dehydrated to produce ethylene gas. This ethylene gas is then put through a polymerisation reactor in the same way that any ethylene gas derived from oil could be put through a polymerization reactor. Bio-sourced polyethylene can be made from other plants, for example, sugar beet/molasses/cellulose. Bio-sourced polyethylene has the same physical properties as oil-based polyethylene, providing it has been polymerized under the same reactor conditions as the oil-sourced polyethylene.

The melt flow index (MFI) is measured according to ASTM D-1238. All references to MFI indicated herein refer to measurements at 190° C. and 2.16 kg as per this standard for HDPE. In general, the more viscous is a material at a given temperature, the lower will be the MFI value of that material.

Selecting a polyethylene resin having the melt flow index of between 0.01 and 10.0 g/10 minutes, preferably between 0.01 and 5.0 g/10 minutes, more preferably between 0.01 and 2.0 g/10 minutes, most preferably from 0.01 to 1.0 g/10 minutes, was found to be an effective means of achieving good environmental stress crack resistance (ESCR) of the resultant containers. Furthermore polyethylene resins preferably have a density of from 0.941 to 0.960 g/cm$^3$. Such resins were also found to result in good environmental stress crack resistance of the containers.

Modulated Differential Scanning Calorimetry (MDSC) was used to determine the melting range and initial crystallinity of Basell 5831D (high density polyethylene) resins compared to Basell Stretchene 1685 (polypropylene). Basell 5831D shows a melting endotherm with a peak maximum at 129.95° C. The peak width (Tmax–Tonset) is 7.89° C. Basell Stretchene 1685 shows a melting endotherm with a peak maximum at 157.4° C. The peak width (Tmax–Tonset) is 17.49° C. The actual melting range is much wider for both materials since the endotherm starts much lower and ends higher. The onset point is defined as the intersection of an initial tangent line with a final tangent line and is not really the start of the endothermic event. For Basell 5831D the range is from about 75° C. to 138° C. and for Basell Stretchene 1685 the range is from about 90° C. to 165° C. These results show that the melting peak/range of high density polyethylene is much narrower than that of polypropylene.

The polyethylene preform is provided in a first process step (a). High cavitation injection molding is the process which is currently widely used to produce performs. However, injection pressures for polyethylene are, at peak pressures of the order of 500 to 800 bar, significantly higher than current processes using polyethylene terephthalate (of the order of 200 to 300 bar), and this may hinder applicability of the process to large cavitation molds (48 cavities and higher). As such, it may be advantageous to inject polyethylene at higher temperatures or use different production techniques for the polyethylene preforms such as injection molding, extrusion blow molding or compression molding.

Preform cooling has an important impact on the cycle time of the preform manufacturing process. For conventional, i.e. polyethylene terephthalate performs, the preforms are not usually cooled in the mold, but the preforms are removed from the mold at the temperature where the preform is structurally strong enough and has no surface tack, and the preform is then put into a cooling unit. The polyethylene performs of the present invention are preferably cooled before being ejected from the first mould. In order to achieve the desired manufacturing cycle time high processing temperatures are typically needed to form preforms from high viscosity, low MFI, resins. The temperature of the preforms is preferably reduced before the preforms are ejected from the first mold if subsequent deformation of the preform is to be avoided.

In a further process step (b) the preform is re-heated, preferably in an infrared oven. Typical reheating temperatures are from about 120° C. to about 140° C. The maximum temperature difference between the hottest and coldest regions of the side wall and the base region of the reheated preform is preferably less than 4° C., and more preferably less than 2° C. In laboratory conditions, temperature of the side wall and base region of the preform temperatures were homogeneous to +/−1° C. prior to exiting the oven.

The reheated preform is transferred to a blow mold and stretched at a pressure below 10 bars, preferably below 5 bars, more preferably below 2 bars. Preferably this preform is stretched by means of a stretch rod. Preferably, the preform is stretched at a speed of greater than 1 m/s. The pressure within the reheated preform is then increased so as to cause the walls of the reheated preform to expand to the shape and dimensions inside the blow mould.

Stretch blow molding polyolefins such as high density polyethylene is difficult to achieve because of the non strain hardening properties of polyolefin resin. Since such resins do not allow the preform wall thinning occurring during expansion to self correct (as with polyethylene terephthalate), all the wall thickness distribution dynamic control has to come from the reheating and stretching process.

Two process control parameters are important in order to minimize wall thickness distribution variation during the preform expansion:
1. Number of spindle rotation in front of each oven infrared lamp so that the preform is evenly exposed to infrared radiation; and
2. Preblow pressure is preferably kept low, preferably below 5 bars, more preferably below 2 bars, most preferably below 1 bar, in order to allow the stretch rod to perform most of the initial wall thickness distribution (for non strain hardening material, stretching is an easier process to control wall thinning process than blowing).

At the end of the stretch blow molding process, the finished container is ejected from the blow mold cavity.

Polyethylene containers produced according to the present invention have the attribute that their resistance to top load is fully developed immediately after manufacture. Polypropylene containers made by a similar injection stretch blow molding process, on the other hand, only achieve peak top load resistance, typically, 72 hours after manufacture due to complex re-crystallisation processes occurring in the blown container material. Consequently polyethylene containers made by the present invention do not require careful handling after blowing and can be produced at high speed, exceeding 600 containers per hour per mold.

Preferably the container made according to the present invention has a minimum wall thickness of the container of 200 micrometers, and the weight to volume ratio of the empty container is less than 50 grams per liter, preferably less than 40 grams per liter, and more preferably less than 30 grams per liter.

The resulting polyethylene container produced by the process described in the invention exhibits enhanced mechanical properties compared to a polyethylene container produced by the traditional extrusion blow molding process. This enables material flexural modulus improvements to be translated into improvements in mechanical properties of the container.

Other material properties are also enhanced by the injection stretch blow molding process. The containers produced according to the invention have overall improved environmental stress crack resistance, improved barrier to water vapor and gases, and improved contact clarity properties.

EXAMPLES

Table I shows density, melt flow index and environmental stress crack resistance for a number of different commercially available polyethylene resins.

TABLE I

| Supplier | Grade | Grade Type | Density | MFI | ESCR[1] |
|---|---|---|---|---|---|
| Basell | 6541 | Injection Molding | 0.954 | 1.45 | >14 days |
| Basell | 6031 | Blow Molding | 0.960 | 0.3 | >14 days |
| Exxon | HYA 800 | Blow Molding | 0.961 | 0.7 | >14 days |
| Chevron Phillips | Marlex 9708 | Injection Molding | 0.962 | 8 | <6 days |
| Chevron Phillips | Marlex 9012 | Injection Molding | 0.952 | 12 | <6 days |
| Chevron Phillips | Marlex 9018 | Injection Molding | 0.952 | 18 | <6 days |

TABLE I-continued

| Supplier | Grade | Grade Type | Density | MFI | ESCR[1] |
|---|---|---|---|---|---|

[1]Environmental stress cracking resistance testing on sealed ISBM bottles filled with liquid detergent and tested at 49° C. (120° F.) with 4.5 kgf (10 lb$_f$) applied top load. The environmental stress cracking resistance test was conducting according to International Organization for Standardization test 16770.

Table II illustrates the importance of the preform design in achieving a container with enhanced properties. Two performs with straight and parallel walls but different neck diameters were blown into the same mold using identical process conditions. The container blown from a preform with larger neck diameter has better performance as a result of radial and longitudinal stretch ratios which are within the recommended tolerances.

TABLE II

| Basell Hostalen 6031 | Radial stretch ratio | Longitudinal stretch ratio | Preform Wall Thickness (mm) | Blown Container Top Load (N) |
|---|---|---|---|---|
| 26 mm Neck Finish | 3.55 | 1.97 | 3.25 | 174.5 |
| 33 mm Neck Finish | 2.87 | 2.03 | 2.8 | 270 |
| HDPE Targets | 2.0-3.0 | 2.0-3.5 | <3.5 mm | >200 |

Table III shows preform temperatures after reheating in an infrared oven. As indicated, in laboratory conditions, preform temperature was homogeneous to +/−1° C. prior to exiting the oven. Such a tight range may not be achievable in industrial conditions but the smaller the temperature variability in the preform, the better the results.

TABLE III

| | | Preform Temperature* (° C.) |
|---|---|---|
| 1. Basell Hostalen 6541 | HDPE | 123-124 |
| 2. Basell Hostalen 6031 | HDPE | 124-126 |
| 3. Exxon HYA800 | HDPE | 125-127 |
| A. Basell Stretchene RP1903 | PP | 125-126 |
| B. Basell Stretchene RP1685 | PP | 135-136 |

*Preform Temperature is the temperature measured on the preform at the exit of the oven.

Table IV compares top load at 4 mm deflection of three containers produced via a reheat injection stretch blow mold process with a 24.5 g preform, to a container of the same design but produced with a 30 g preform by an extrusion blow molding process. The top load values are remarkably similar despite a 20% weight reduction for the ISBM container, indicating that the reheat stretch blow mold process has significantly enhanced the mechanical properties of the material. These excellent top load values were obtained using a 33 mm neck finish preform allowing good processability of the HDPE with no wall thickness below 0.2 mm anywhere in the blown container.

TABLE IV

| 24.5 g 33 mm neck | Average Top Load @ 4 mm | Index HPDE EBM 30 g |
|---|---|---|
| Basell 6541 | 255 | 98 |
| Basell 6031 | 270 | 103 |
| Exxon HYA 800 | 262 | 100 |

Table V provides a mechanistic explanation for the higher top load values disclosed in table IV. As shown, the flexural modulus of the resin in the bottle produced via the reheat stretch blow mold process has been significantly enhanced compared to the identical design bottle produced via an extrusion blow molding (EBM) process Whilst, the flexural modulus of the plastic in the EBM bottle is lower than what is reported in the specification sheet, the flexural modulus of the plastic in the ISBM bottles is higher than what is reported in the resin specification sheets, indicating a net increase of 60% to 100% between the EBM and ISBM process.

TABLE V

| Resin Type | Flexural Modulus Resin Spec. Sheet (MPa) | Blowing technology used to blow bottle | Flexural Modulus Blown Bottle (MPa) | Index |
|---|---|---|---|---|
| Basell 6541 | 1100 | reheat stretch blow mold | 1636 | 149 |
| Basell 6031 | 1350 | reheat stretch blow mold | 1554 | 115 |
| Exxon HYA 800 | 1050 | reheat stretch blow mold | 1470 | 140 |
| Marlex HHM 5502 | 1380 | EBM | 995 | 71 |

Table VI provides a mechanistic explanation for the higher top load values disclosed in table V. As shown, the tensile yield strength values of the resin in the bottle produced via the reheat stretch blow mold process has been significantly enhanced compared to the identical design bottle produced via an extrusion blow molding (EBM) process.

TABLE VI

| Resin Type | Tensile Yield Strength Resin Spec. Sheet (MPa) | Blowing technology used to blow bottle | Tensile Yield Strength Blown Bottle (MPa) | Index |
|---|---|---|---|---|
| Basell 6541 | 22 | reheat stretch blow mold | 42 | 191 |
| Basell 6031 | 30 | reheat stretch blow mold | 57 | 190 |
| Exxon HYA 800 | 30 | reheat stretch blow mold | 57 | 190 |
| Marlex HHM 5502 | 28 | EBM | 22 | 79 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for blow molding a polyethylene container comprising the steps of:
   a) providing a solid preform made from a polyethylene material having a melt flow index from about 0.01 to about 10.0 g/10 minutes, wherein the preform comprises a neck region, side walls and a base region, and wherein the side walls between the neck region and the base region have substantially straight and parallel outer walls;
   b) reheating the preform so that the maximum temperature difference between a hottest region and coldest a region of the side walls and the base region of the reheated preform is less than about 4° C.;
   c) transferring the reheated preform to a blow mold cavity, the blow mould cavity having a shape and dimensions;
   d) stretching the reheated preform at a pressure below about 10 bars to form a stretched preform; and
   e) increasing the pressure within the reheated preform so as to cause the walls of the stretched preform to expand to the shape and dimensions inside the blow mould cavity.

2. A process according to claim 1 wherein the polyethylene material is high density polyethylene having a density of from about 0.941 to about 0.960 g/cm$^3$.

3. A process according to claim 1 wherein the preform is stretched by means of a stretch rod at a speed greater than about 1 m/s.

4. A process according to claim 1 wherein the preform is formed in step a) by a process selected from the group comprising injection molding, extrusion blow molding, and compression molding.

5. A process according to claim 1 wherein the preform is reheated in step b), and wherein the maximum temperature difference between the hottest and coldest regions of the side walls and the base region of the reheated preform is less than about 2° C.

6. A process according to claim 1, wherein the polyethylene container has a minimum wall thickness of about 200 micrometers.

7. A process according to claim 1, wherein the polyethylene container has a weight to volume ratio of less than about 50 grams per liter.

8. A process according to claim 1, wherein the polyethylene container has a minimum wall thickness of about 200 micrometers and has a weight to volume ratio of less than about 50 grams per liter.

* * * * *